(12) United States Patent
Siomina et al.

(10) Patent No.: US 10,715,265 B2
(45) Date of Patent: Jul. 14, 2020

(54) METHODS AND APPARATUSES FOR CONTROLLING MEASUREMENTS BANDWIDTH TO ACCOUNT FOR IMPAIRMENTS

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE); Joakim Axmon, Limhamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/090,346

(22) PCT Filed: Mar. 28, 2017

(86) PCT No.: PCT/IB2017/051747
§ 371 (c)(1),
(2) Date: Oct. 1, 2018

(87) PCT Pub. No.: WO2017/168308
PCT Pub. Date: Oct. 5, 2017

(65) Prior Publication Data
US 2019/0123840 A1    Apr. 25, 2019

Related U.S. Application Data

(60) Provisional application No. 62/317,030, filed on Apr. 1, 2016.

(51) Int. Cl.
*H04W 4/00*    (2018.01)
*H04B 17/336*    (2015.01)
(Continued)

(52) U.S. Cl.
CPC .......... *H04B 17/336* (2015.01); *H04W 24/00* (2013.01); *H04W 24/08* (2013.01)

(58) Field of Classification Search
None
See application file for complete search history.

(56) References Cited

U.S. PATENT DOCUMENTS 8,320,276 B1 * 11/2012 Callender ............... H04L 5/001
370/236

FOREIGN PATENT DOCUMENTS

WO    2017168308 A1    10/2017

OTHER PUBLICATIONS

Ericsson, "Considerations on RS-SINR," 3GPP TSG-RAN WG4 Meeting# 76, R4-154568; Beijing, China, Aug. 24-28, 2015, 6 pages.

(Continued)

*Primary Examiner* — Zewdu A Beyen
(74) *Attorney, Agent, or Firm* — Sage Patent Group

(57) ABSTRACT

There are provided methods, apparatuses, and computer programs for improving measurement of a reference signal parameter measured by a wireless device, the reference signal parameter being a parameter of a reference signal transmitted by a radio network node in a wireless communication network. An example method includes determining that the wireless device is operating with a low measurement accuracy condition that affects measurement of the reference signal parameter. A severity of the low measurement accuracy condition has a positive correlation with the quality of a channel over which the reference signal is received. The method further includes adapting a first measurement bandwidth in response to determining that the wireless device has the low measurement accuracy condition that is positively correlated with the quality of the channel. The method (Continued)

further includes measuring a first reference signal parameter using the adapted first measurement bandwidth.

13 Claims, 10 Drawing Sheets

(51) Int. Cl.
*H04W 24/00* (2009.01)
*H04W 24/08* (2009.01)

(56) References Cited

OTHER PUBLICATIONS

Ericsson, "On RS-SINR accuracy in low load scenarios," 3GPP TSG-RAN WG4 Meeting #78bis, R4-162152; San Jose del Cabo, Mexico, Apr. 11-15, 2016, 2 pages.
Ericsson, "RS-SINR link level results," 3GPP TSG-RAN WG4 Meeting # 76bis, R4-155767; Sophia Antipols, France, Oct. 12-16, 2015, 7 pages.
Ericsson, "RS-SINR measurement accuracy requirements," 3GPP TSG-RAN WG4 Meeting #78bis, R4-162153; San Jose del Cabo, Mexico, Apr. 11-15, 2016, 4 pages.
ZTE, "Further discussion on wideband RSRQ measurement," 3GPP TSG-RAN WG4 #64bis, R4-125846; Santa Rosa, United States, Oct. 8-12, 2012, 4 pages.

* cited by examiner

METHODS AND APPARATUSES FOR CONTROLLING MEASUREMENTS BANDWIDTH TO ACCOUNT FOR IMPAIRMENTS

This application is a 371 of International Application No. PCT/IB2017/051747, filed Mar. 28, 2017, the disclosure of which is fully incorporated herein by reference.

TECHNICAL FIELD

The disclosed subject matter relates generally to telecommunications and more particularly to methods and apparatuses for controlling measurement bandwidth to account for impairments such as frequency error.

BACKGROUND

Currently, Reference Signal-Signal to Noise and Interference Ratio (RS-SINR) is a User Equipment (UE) radio measurement agreed in $3^{rd}$ Generation Partnership Project (3GPP) for multi-carrier load distribution. The measurement period for RS-SINR is the same as the measurement period for the legacy Reference Signal Received Power (RSRP) and Reference Signal Received Quality (RSRQ), i.e., 200 ms. The RS-SINR measurement definition from 3GPP TS 36.214 v.13.1.0 is as the linear average over the power contribution (in Watts) of the resource elements carrying cell-specific reference signals divided by the linear average of the noise and interference power contribution (in Watts) over the resource elements carrying cell-specific reference signals within the considered measurement frequency bandwidth.

Typically, measurement accuracy increases in better interference conditions, e.g. improving signal the ratio of received energy to total interference (Es/Iot) is generally expected to improve measurement accuracy. However, the opposite has been observed analytically and based on simulations. In particular, at a high Es/Iot, the RS-SINR measurement accuracy may degrade (e.g., by 1 dB at Es/Iot=16 dB) and one of the reasons is a static error due to a frequency shift, also referred to herein as frequency error, seen at the receiver.

The frequency error is the difference between the UE carrier frequency (F1) on which the UE receives a signal from a network node or another UE and the carrier frequency (F1') on which the network node or another UE transmits the signal. The frequency error may be determined between the center frequencies, F1 and F1'. Ideally frequency error between F1 and F1' should be zero or negligible. But due to UE impairments the frequency error is non-negligible.

The frequency error may be different on an uplink (UL) frequency and a downlink (DL) frequency, e.g. in FDD, HD-FDD schemes, among others. For example, in UL the frequency error is the difference between the UE carrier frequency (F2) on which the UE transmits a signal to a network node or another UE and the carrier frequency (F2') on which the network node or the another UE receives the signal.

Frequency error is also referred to as frequency offset, frequency deviation etc. It can be expressed in parts-per-million (PPM), parts-per-billion (PPB), Hz, KHz etc. The frequency error also depends on one or more of: UE speed and the value of the frequency. Typically frequency error increases with an increase in frequency, e.g. ±50 Hz error at 1 GHz and ±100 Hz error at 2 GHz). As an example the UE modulated carrier frequency is accurate to within ±0.1 PPM observed over a period of one time slot (0.5 ms) compared to the carrier frequency received from the network node e.g. E-UTRA Node B.

FIGS. 1 and 2 illustrate degradation of RS-SINR measurement accuracy with increasing Signal to Noise Ratio (SNR) for different levels of frequency error or shift. FIG. 1 illustrates a graph of a simulated measurement of RS-SINR on the y axis versus an actual SNR of the reference signal on the x axis when a frequency error is 20 Hz. FIG. 2 illustrates a graph of a simulated measurement of RS-SINR on the y axis versus an actual SNR of the reference signal on the x axis when a frequency error is 50 Hz. As illustrated by these graphs, an increase in frequency error exacerbates the RS-SINR measurement inaccuracy. The frequency error may be caused by different reasons or conditions, e.g., transmitter imperfections, receiver imperfections, UE clock inaccuracy, high carrier frequency (e.g., above a threshold), etc.

Time offset error is the difference between the time instance the UE receives a signal from a network node or another UE and the time instance the network node or the other UE transmits the signal. This includes timing error due to UE impairments, propagation delay between the UE and the network node or the other UE, and also multipath propagation delay. The time offset is also referred to as timing error etc. It is typically expressed in microseconds or, alternatively, in basic time units of Ts seconds, where Ts is specified in the relevant 3GPP standard specifications to be 32.55 ns.

SUMMARY

Certain embodiments are presented in recognition of shortcomings associated with conventional approaches. For example, conventional approaches may experience an increase of accuracy degradation of reference signal parameter measurement with the quality of the channel, e.g., as measured by Es/Iot, over which the reference signal is received. Accordingly, an object of at least some embodiments is overcoming these and other shortcomings.

According to a first aspect, a method and embodiments thereof that achieve the object is performed in a wireless device operable to communicate in a wireless communication network and improves a measurement of a reference signal parameter. The reference signal parameter is a parameter of a reference signal that is transmitted by a radio network node in the wireless communication network. The method comprises determining that the wireless device is operating with a low measurement accuracy condition that affects measurement of the reference signal parameter. A severity of the low measurement accuracy condition has a positive correlation with the quality of a channel over which the reference signal is received. The method further comprises adapting a first measurement bandwidth in response to determining that the wireless device has the low measurement accuracy condition that is positively correlated with the quality of the channel and measuring a first reference signal parameter using the adapted first measurement bandwidth.

In certain embodiments, the low measurement accuracy condition includes at least one of: a frequency error condition in which a frequency of a carrier of the reference signal is mismatched with a frequency on which the wireless device receives the carrier, an IQ imbalance condition in a receiver of the wireless device, and a downlink timing misalignment condition in which a time at which the receiver of the wireless device expects a downlink subframe of the reference signal to start is misaligned with respect to the time at which the downlink subframe actually starts.

In certain embodiments, the method further comprises reporting the low measurement accuracy condition to the radio network node. The method may further comprise adapting a second measurement bandwidth for measuring a second reference signal parameter in response to determining that the wireless device has the low measurement accuracy condition that is positively correlated with the quality of the channel. The method may further comprise modifying the measured first reference signal parameter to compensate for the low measurement accuracy condition. The method may further comprise one or more of: reporting the measured first reference signal parameter to another node, logging the measured first reference signal parameter, and/or using the measured first reference signal parameter for one or more operational tasks.

According to a second disclosed aspect, a method is performed in a radio network node operable to communicate with the wireless device in the wireless communication network to improve the measurement of the reference signal parameter. The method comprises determining that the wireless device is operating with a low measurement accuracy condition that affects measurement of the reference signal parameter. A severity of the low measurement accuracy condition has a positive correlation with the quality of a channel over which the reference signal is received. The method further comprises adapting a first measurement bandwidth in response to determining that the wireless device has the low measurement accuracy condition that is positively correlated with the quality of the channel. The method further comprises configuring the wireless device to measure a first reference signal parameter using the adapted first measurement bandwidth.

In certain embodiments, determining that the wireless device is operating with a low measurement accuracy condition includes receiving an indication from the wireless device that the wireless device is operating with the low measurement accuracy condition. Moreover, in certain embodiments, the method may further comprise assisting the wireless device in modifying the measured first reference signal parameter to compensate for the low measurement accuracy condition.

According to a third aspect, a wireless device is disclosed, the wireless device being operable to measure a reference signal parameter of a reference signal transmitted by a radio network node in a wireless communication network, the wireless device being further operable to carry out the method of the first aspect. The wireless device may further comprise at least one transceiver, at least one processor, and memory comprising instructions executable by the at least one processor whereby the wireless device is operable to carry out the method of the first aspect.

According to a fourth aspect, a radio network node is disclosed, the radio network node being operable to improve measurement of a reference signal parameter of a reference signal transmitted by the radio network node and measured by a wireless device in a wireless communication network, the radio network node being further operable to carry out the method of the second aspect. The radio network node may further comprise at least one transceiver, at least one processor, and memory comprising instructions executable by the at least one processor whereby the radio network node is operable to carry out the method of the second aspect.

According to a fifth aspect, a computer program is disclosed. The computer program comprises computer code which, when run on processing circuitry of a wireless device, causes the wireless device to carry out the method of the first aspect. According to a sixth aspect, the computer program comprises computer code which, when run on processing circuitry of a radio network node, causes the radio network node to carry out the method of the second aspect.

According to a seventh aspect, a computer program product comprising a computer program according to any one of the fifth or sixth aspects is disclosed. According to an eight aspect, a carrier containing the computer program according to any one of the fifth or sixth aspects is disclosed.

Certain embodiments of the present disclosure may provide one or more technical advantages. For example, in certain embodiments measurement accuracy is improved when measuring reference signal parameters, particularly when a severity of a low measurement accuracy condition has a positive correlation with the quality of a channel over which the reference signal is received. The improved measurement accuracy may advantageously improve reliability and speed of cell selection and/or channel characterization and may advantageously reduce signaling overhead. Other advantages may be readily apparent to one having skill in the art. Certain embodiments may have none, some, or all of the recited advantages.

BRIEF DESCRIPTION OF THE DRAWINGS

The drawings illustrate selected embodiments of the disclosed subject matter. In the drawings, like reference labels denote like features.

DESCRIPTION

Figure 1:
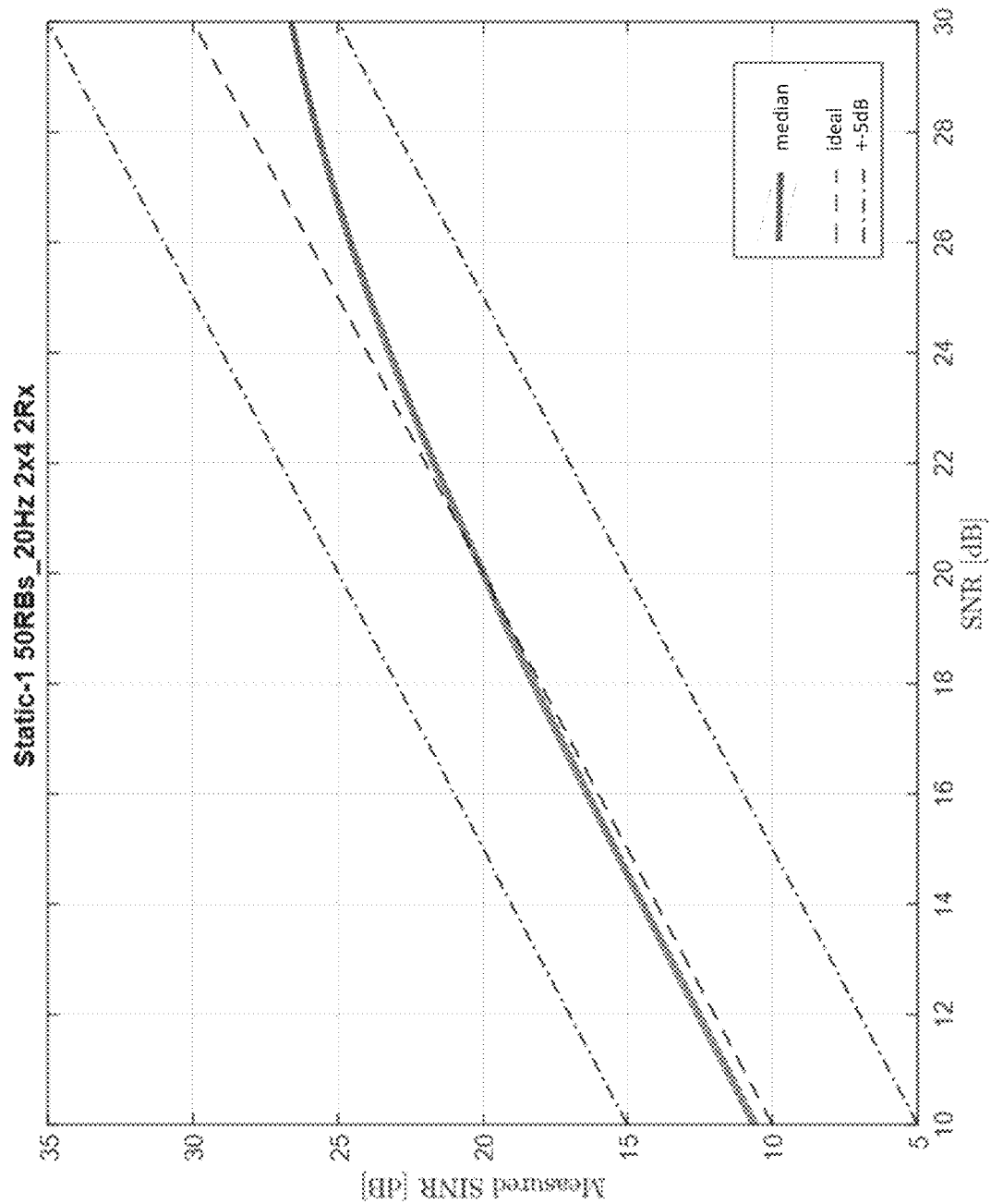
FIG. 1 illustrates a graph of RS-SINR accuracy for a frequency shift of 20 Hz.
Figure 2:
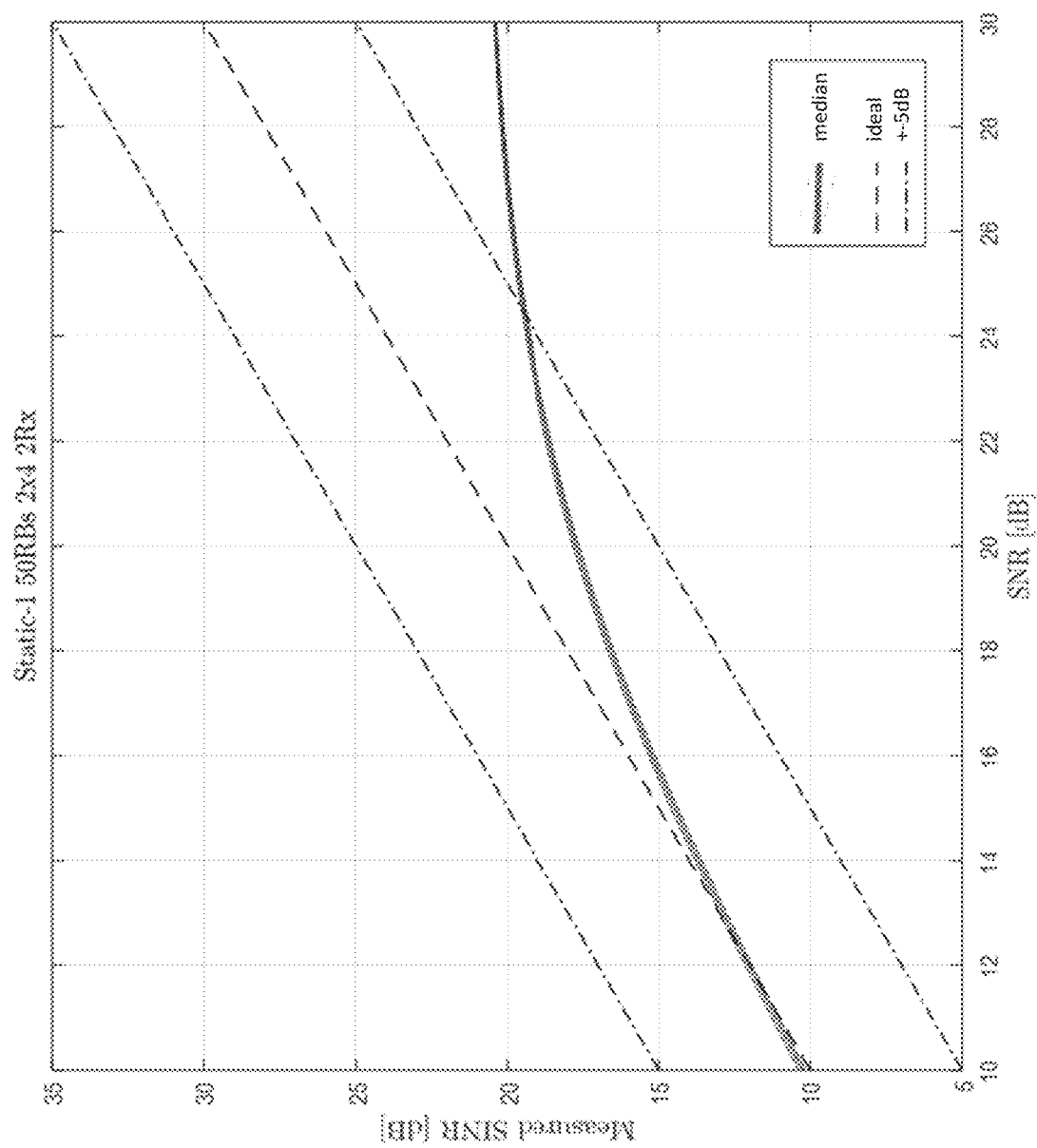
FIG. 2 illustrates a graph of RS-SINR accuracy for a frequency shift of 50 Hz.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Certain embodiments are presented in recognition of shortcomings associated with conventional approaches. For example, conventional approaches may experience an increase of accuracy degradation of reference signal parameter measurement with the quality of the channel, e.g., as measured by Es/Iot, over which the reference signal is received. Conventional approaches may, in particular, experience a large impact from frequency error especially at high Es/Iot.

In this description, the term "wireless device," also referred to herein as a UE, may refer to any type of wireless device capable of communicating with a radio network node or another wireless device over radio signals. The wireless device may be a radio communication device, a target device, a device to device (D2D) UE, a machine type UE or a UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

The term "radio network node" may refer to any type of network node capable of communicating with one or more wireless devices over radio signals to provides network access to the one or more wireless devices. A radio network node may include, for example, a base station, a radio base station, a base transceiver station, a base station controller, a network controller, an evolved Node B (eNB), a Node B, a Multi-cell/multicast Coordination Entity (MCE), a relay node, an access point, a radio access point, a Remote Radio Unit (RRU) Remote Radio Head (RRH), etc.

The term "measurement" refers to radio measurements. Some examples of the radio measurements are: signal strength or signal power measurements (e.g., RSRP or CSI-RSRP), signal quality measurements (e.g., RSRQ, SINR, RS-SINR), timing measurements (e.g., Rx-Tx, RSTD, RTT, TOA), radio link monitoring measurements (RLM), cell identification, CSI, CQI, PMI, etc. The measurements may be absolute or relative (e.g., absolute RSRP and relative RSRP). The measurements may be performed for one or more different purpose, e.g., RRM, SON, positioning, MDT, etc. The measurements may be, e.g., intra-frequency measurements, inter-frequency measurements, or CA measurements. The measurements may be performed in the licensed and/or unlicensed spectrum.

The term "SINR" measurement refers to a measurement of a signal to interference plus noise ratio. In one example, the measurement can comprise averaged signal and/or averaged interference plus noise. In another example the SINR measurement can be an averaged ratio. In one example, the SINR measurement is the RS-SINR measurement in LTE, as described in the background. In another example, the SINR measurement is a UE-implementation specific SINR.

The term "condition" used herein in general refer to a radio condition. Radio conditions may be characterized, e.g., by presence or absence (e.g., due to muting or LBT) of a certain signal or transmissions of a certain type or from a certain node. Radio conditions may include any one or more of: channel quality, Ês/Iot (e.g., as defined in 3GPP TS 36.133 v.13.2.0 where: Ês is the received energy per RE, power normalized to the subcarrier spacing, during the useful part of the symbol, i.e. excluding the cyclic prefix, at the UE antenna connector; and Iot is the received power spectral density of the total noise and interference for a certain RE, power integrated over the RE and normalized to the subcarrier spacing, as measured at the UE antenna connector), signal to interference plus noise ratio (SINR), SIR (signal to interference ratio), SNR (signal to noise ratio), received signal quality, received signal strength, total interference or interference on specific time and/or frequency resources or from a specific interferer(s), RSRP, RSRQ, CSI-RSRP. Radio conditions may correspond to two different measurement periods, for example: Es/Iot>=threshold1 for which the corresponding measurement period is T1 and threshold1>Es/Iot>=threshold2 for which the corresponding measurement period is T2 (T2 is not equal T1).

Figure 3:
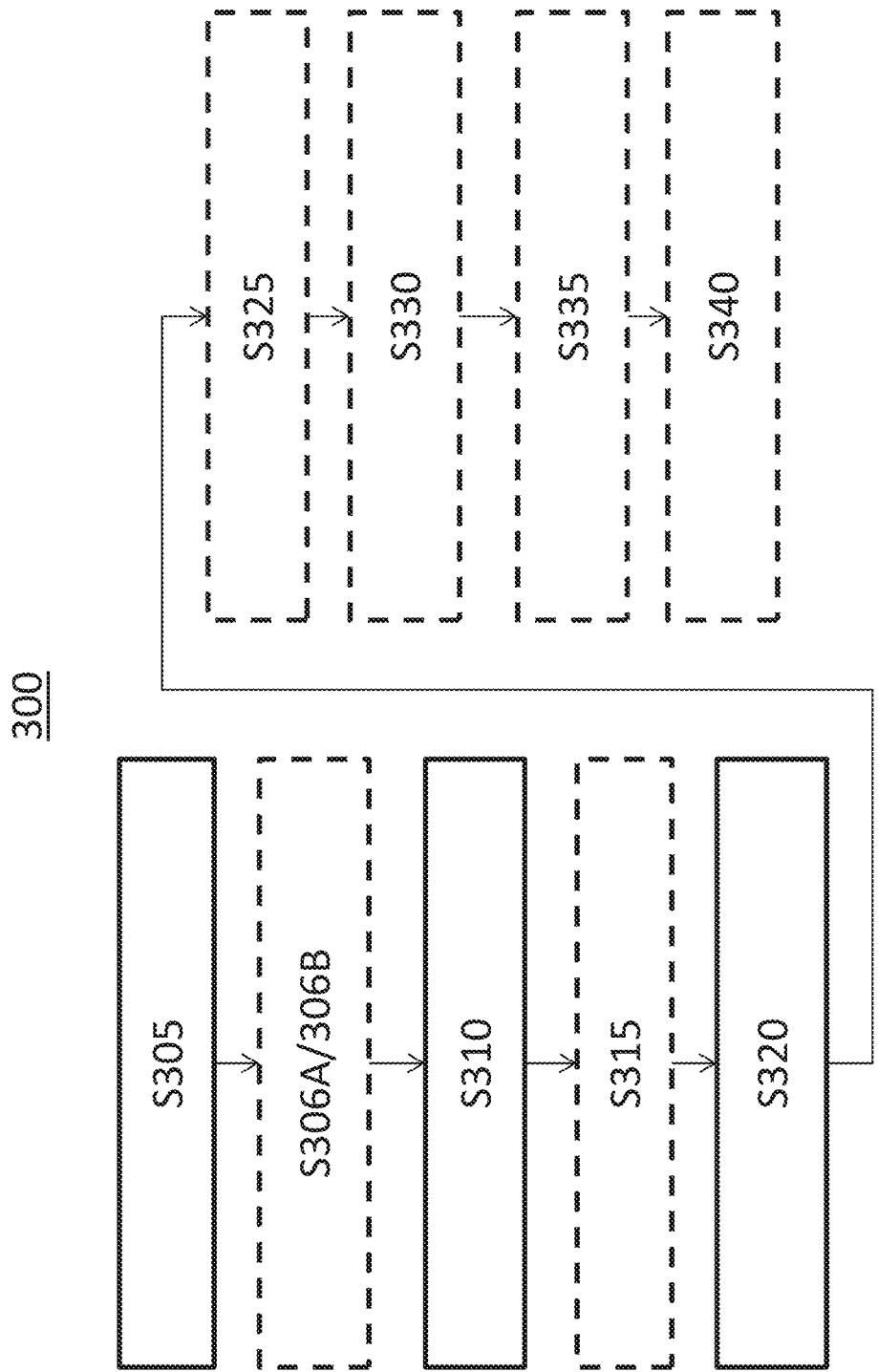
FIG. 3 illustrates a method in a UE according to an embodiment.

FIG. 3 illustrates a method 300 implemented in a wireless device according to certain embodiments. In the described method measurements may include, for example, SINR as a first measurement, and RSRQ and/or RSRP as second measurements. The method 300 includes determining that the wireless device is operating with a low measurement accuracy condition that impairs or otherwise affects measurement of a reference signal parameter in a receiver of the wireless device (S305). Examples of a low measurement accuracy condition include, e.g.:

when a frequency error of a carrier frequency is above a threshold, when an interference condition in which an interference parameter, such as RSSI, Noc, or Iot is above a threshold, or a received power from one or more strongest interferers is above a second threshold, and/or when a measurement quality or signal/channel quality parameter (e.g., SNR; SINR over a smaller bandwidth or over a default bandwidth of, e.g., 6 Resource Blocks; RSRQ, etc.) is above a threshold.

The condition may be a static condition or, in some embodiments, may be a semi-static condition. Moreover, an absolute value of a parameter associated with the condition may be measured and compared to a threshold or, in some embodiments, a value of the parameter relative to another measured parameter or relative to a reference value may be compared to the threshold. Embodiments of the invention are particularly applicable when a severity of the low measurement accuracy condition increases with the quality of a channel over which the reference signal is received.

The determination that the wireless device is operating with a low measurement accuracy condition may be accomplished in various ways. For example, the determination may include the following sub-steps or functions:

Performing a measurement of a parameter such as signal strength, signal/channel quality, and/or interference power on which a determination of the low measurement accuracy condition depends;

Evaluating a measurement of a parameter (e.g., by comparing to a threshold) on which a determination of the low measurement accuracy condition depends;

Estimating or predicting interference, which is indicative of a low measurement accuracy condition;

Estimating or predicting a measurement quality or channel quality on which a determination of the low measurement accuracy condition depends;

Detecting the presence of a frequency shift or error in the wireless device;

Estimating an amount of frequency shift or error;

Determining a probability of frequency error;

Determining that a frequency error or other parameter is above a first threshold and/or below a second threshold, e.g., determining that an absolute value of the frequency error is above a threshold of about 50 Hz;

Determining the probability that a frequency error or other parameter is above a first threshold and/or below a second threshold;

Tracking changes of the frequency error or other parameter in time;

Obtaining one or more parameters associated with the first carrier frequency on which a determination of the low measurement accuracy condition depends. The one or more parameters may include, e.g., frequency band of the first carrier, frequency channel number such as EARFCN, absolute frequency of the first carrier, duplex gap between UL and DL frequencies. Parameters associated with the first carrier frequency may be used to indicate a frequency error (or a probability of frequency error) because the frequency error is typically larger at a higher frequency such as at 2 GHz or above or at 6 GHz or above;

Obtaining a wireless device transmitter characteristic, e.g. a transmitter RF characteristic.

Obtaining a wireless device receiver characteristic or type of receiver used for performing the first measurement. For example, a determination of the low measurement accuracy condition may depend on whether the wireless device receiver uses MMSE-MRC, in which case a frequency error may be compared to a threshold, or MMSE-IRC, in which case interference is mitigated and the frequency error is not as detrimental;

Detecting the presence of time offset, i.e., an offset between a received signal time and a network node signal transmission time.

The determining step S305 may be performed autonomously by the wireless device and/or in response to receiving a message or command from another node. Moreover, in certain embodiments, the determining step S305 may be performed periodically, at aperiodic intervals, and/or may be triggered by one or more events or conditions. For example, the determining step S305 may be performed in response to or based on:

an outcome of a pre-defined rule,
measurements satisfying one or more criteria,
wireless device performance statistics satisfying one or more criteria,
historical data or measurements,
a mapping or a table,
an indication from another node.

The method 300 may further include reporting or indicating to another node (e.g., a network node or another wireless device) the determined low measurement accuracy condition (S306A). Alternatively, or in addition, the wireless device may implicitly or explicitly indicate to another node a need to adapt a measurement bandwidth for measuring the reference signal parameter (S306B). For example, in certain embodiments, the wireless device may indicate to the another node a certain preferred measurement bandwidth.

The method 300 may further include adapting a first measurement bandwidth for measuring a first reference signal parameter in response to determining that the wireless device has the low measurement accuracy condition (S310) and adapting a second measurement bandwidth for measuring a second reference signal parameter in response to determining that the wireless device has the low measurement accuracy condition (S315). An example first reference signal parameter is SINR and an example second reference signal parameter is RSRQ, CSI-RSRQ, or SNR. The first and the second measurements may be performed in parallel for example during at least partly overlapping time periods or measurement times. Moreover, in some embodiments the first and the second measurements may be used as complementary measurements, e.g., analyzed together by a node using the measurements. Furthermore, in some embodiments, the second measurement bandwidth is adapted to be the same as the first measurement bandwidth of the first measurement. Adapting a measurement bandwidth may, in certain embodiments, include increasing the measurement bandwidth. In some embodiments, there may be a maximum allowed measurement bandwidth to which the measurement bandwidth can be increased.

The method may also include measuring a first reference signal parameter using the adapted first measurement bandwidth on at least one cell belonging to or operating on the first carrier using the adapted first measurement bandwidth (S320).

The method 300 may still further include modifying the measured first reference signal parameter to compensate for the low measurement accuracy condition (S325), performing the second measurement using the adapted second measurement bandwidth (S330); reporting the first measurement to another node, logging the first measurement, and/or using the first measurement for one or more operational tasks (S335); and reporting the second measurement to another node, logging the second measurement, and/or using the second measurement for one or more operational tasks (S340). Examples of operational tasks include using the measurement for positioning, cell selection, cell reselection, and/or load balancing.

In some embodiments, one or both adapting steps S310 and S315 may include any one or more of the following sub-steps or functions:

selecting the measurement bandwidth from a predetermined set of bandwidth values;

selecting a pre-defined or pre-configured bandwidth of, e.g., at least 10 MHz or 50 Resource Blocks (RBs);

determining the measurement bandwidth based on a pre-defined rule (e.g., increase the bandwidth up to the maximum allowed measurement bandwidth);

determining if certain criteria is/are met, such as if the absolute value of a frequency error is above a threshold and if the wireless device has been configured with at least one parameter related to the measurement bandwidth for performing the measurement and, if the criteria are met, increasing the measurement bandwidth by, e.g., at least 10 MHz (examples of the at least one parameter may include the measurement bandwidth, a maximum allowed measurement bandwidth, and an indicator indicating whether to use a larger measurement bandwidth or not);

determining a value of the frequency error and selecting the measurement bandwidth based on at least the value of the frequency error, e.g. using a measurement bandwidth that is larger or smaller in proportion to the frequency error (in one embodiment, a measurement bandwidth of 50 RBs is selected if the absolute frequency error is 50 Hz or larger, otherwise a measurement bandwidth of 6 RBs is selected);

determining a value of the frequency error and a signal quality parameter (a signal strength parameter, such as RSRP, SCH received power, RSRQ, SNR, CRS Ês/Iot, SCH Ês/Iot, PRS Ês/Iot, etc.) of the reference signal for which a parameter is being measured and selecting the measurement bandwidth based on at least the value of the frequency error and the signal quality parameter, e.g. increasing measurement bandwidth for a frequency error above a threshold and signal quality level below a threshold (in one embodiment, a measurement bandwidth of 50 RBs is selected if absolute frequency error is 50 Hz or larger and the signal quality parameter is above a threshold, such as SNR/SINR being above 10 dB, otherwise a measurement bandwidth of 6 RBs is used);

determining a severity of the low measurement accuracy condition and selecting the measurement bandwidth based at least on the severity of the low measurement accuracy condition, e.g., select a larger bandwidth when the interference is low (e.g., below a threshold)

and/or channel/signal quality is good (e.g., above a threshold) since this may imply a larger SINR measurement error due to frequency error or frequency shift if the larger bandwidth is not selected;

determining a value of the frequency error and of the carrier frequency of the reference signal and selecting the measurement bandwidth based on at least the value of the frequency error and the carrier frequency, e.g., using a larger measurement bandwidth for a frequency error above a threshold and a carrier frequency above a threshold and otherwise using a default measurement bandwidth (in one embodiment, a measurement bandwidth of 50 RBs is selected if the absolute frequency error is 50 Hz or larger and if the carrier frequency is 2 GHz or larger, otherwise a measurement bandwidth of 6 RBs is used);

determining a value of the frequency error, the carrier frequency of the reference signal, and a time offset value and selecting the measurement bandwidth based on at least these three parameters, e.g., using a larger measurement bandwidth for a frequency error above a threshold, a carrier frequency above a threshold, and a time offset above a threshold, and otherwise using a default measurement bandwidth (in one embodiment, a measurement bandwidth of 50 RBs is selected if the absolute frequency error is 50 Hz or larger, the carrier frequency is 2 GHz or larger, and an absolute time offset is 1 μs or larger, otherwise a measurement bandwidth of 6 RBs is used).

Method 300 is provided by way of example for illustration purposes. Other embodiments are contemplated in which certain steps are added, omitted, and/or arranged in a different order. For example, one or more of steps S306A, S306B, S315, and steps S325-S340 are optional in certain embodiments. Moreover, additional steps may be added, such as signaling to another network node or another wireless device the adapted first and/or second measurement bandwidth or an indication that the first and/or second measurement bandwidth was adapted. In addition, or alternatively, a compensation factor or an indication that compensation was applied in step S325 may be signaled to another network node or another wireless device. Furthermore, in some embodiments, the step of determining that the wireless device is operating with a low measurement accuracy condition (S305) may be repeated regularly or at certain intervals to assess whether the low measurement accuracy condition has improved or worsened.

Figure 4:
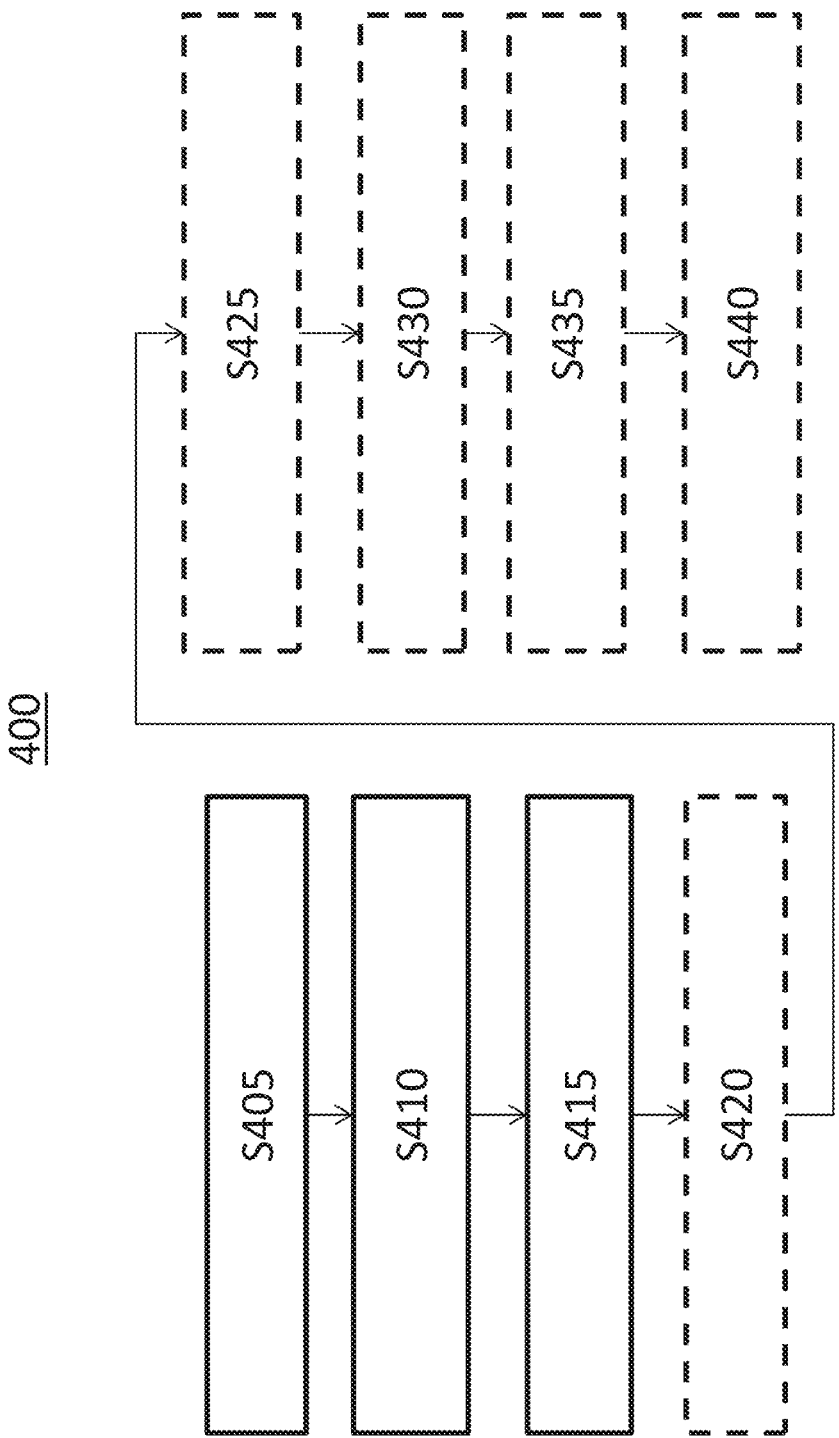
FIG. 4 illustrates a method in a network node according to an embodiment.

FIG. 4 illustrates a method 400 implemented in a radio network node according to certain embodiments. The method 400 includes determining that the wireless device is operating with a low measurement accuracy condition that affects measurement of a reference signal parameter (S405). The low measurement accuracy condition may include the conditions described above with reference to method 300 and the low measurement accuracy condition determination may include the sub-steps or functions described above with reference to step S305 of method 300, with the radio network node receiving any necessary measurements or information from the wireless device to carry out the sub-steps or functions. Alternatively, the wireless device may detect a low measurement accuracy condition and the radio network node may receive an indication from the wireless device of the low measurement accuracy condition. In one embodiment, the indication may be in the form of the wireless device indicating to the radio network node a need to adapt a first measurement bandwidth used to measure the reference signal parameter. For example, the wireless device may indicate a preferred measurement bandwidth.

The determining step S405 may be performed autonomously by the radio network node and/or in response to certain events or conditions, such as on one or more wireless device measurements, a message or indication received from the wireless device, and/or a receiver characteristic or capability of the wireless device (e.g., a characteristics or capability related to handling frequency error in the wireless device and/or performing RS-SINR measurements in good signal/channel quality conditions).

The method 400 further includes adapting a first measurement bandwidth in response to determining that the wireless device has the low measurement accuracy condition (S410); and configuring the wireless device to measure the first reference signal parameter using the adapted first measurement bandwidth (S415). The method 400 may further include adapting a second measurement bandwidth for measuring a second reference signal parameter in response to determining that the wireless device has the low measurement accuracy condition (S420). For example, the second measurement bandwidth of the second measurement may be configured to be the same as the first measurement bandwidth of the first measurement. The adapting of one or both of steps S415 and S420 may include the sub-steps or functions described above with reference to step S310 and S315 of method 300. The radio network node may also assist the wireless device in modifying the measured first reference signal parameter to compensate for the low measurement accuracy condition (S430), may receive the first measurement from the wireless device (S435), and may receive the second measurement from the wireless device (S440).

Method 400 is provided by way of example for illustration purposes. Other embodiments are contemplated in which certain steps are omitted and/or arranged in a different order. For example, one or more of steps S420-S440 are optional in certain embodiments. Moreover, in some embodiments the method 400 includes additional steps. For example, the radio network node may use one or both of the received measurements in steps S435 and S440 to perform one or more operational tasks. The radio network node may also receive an indication from the wireless device of the bandwidth over which one or both measurement were performed and/or indication of whether a measurement bandwidth was adapted. The radio network node may also receive an indication from the wireless device that the compensation described above in step S325 of method 300 was applied by the wireless device. Furthermore, in some embodiments the step of determining that the wireless device is operating with a low measurement accuracy condition (S405) may be repeated regularly or at certain intervals to assess whether the low measurement accuracy condition has improved or worsened.

Figure 5:
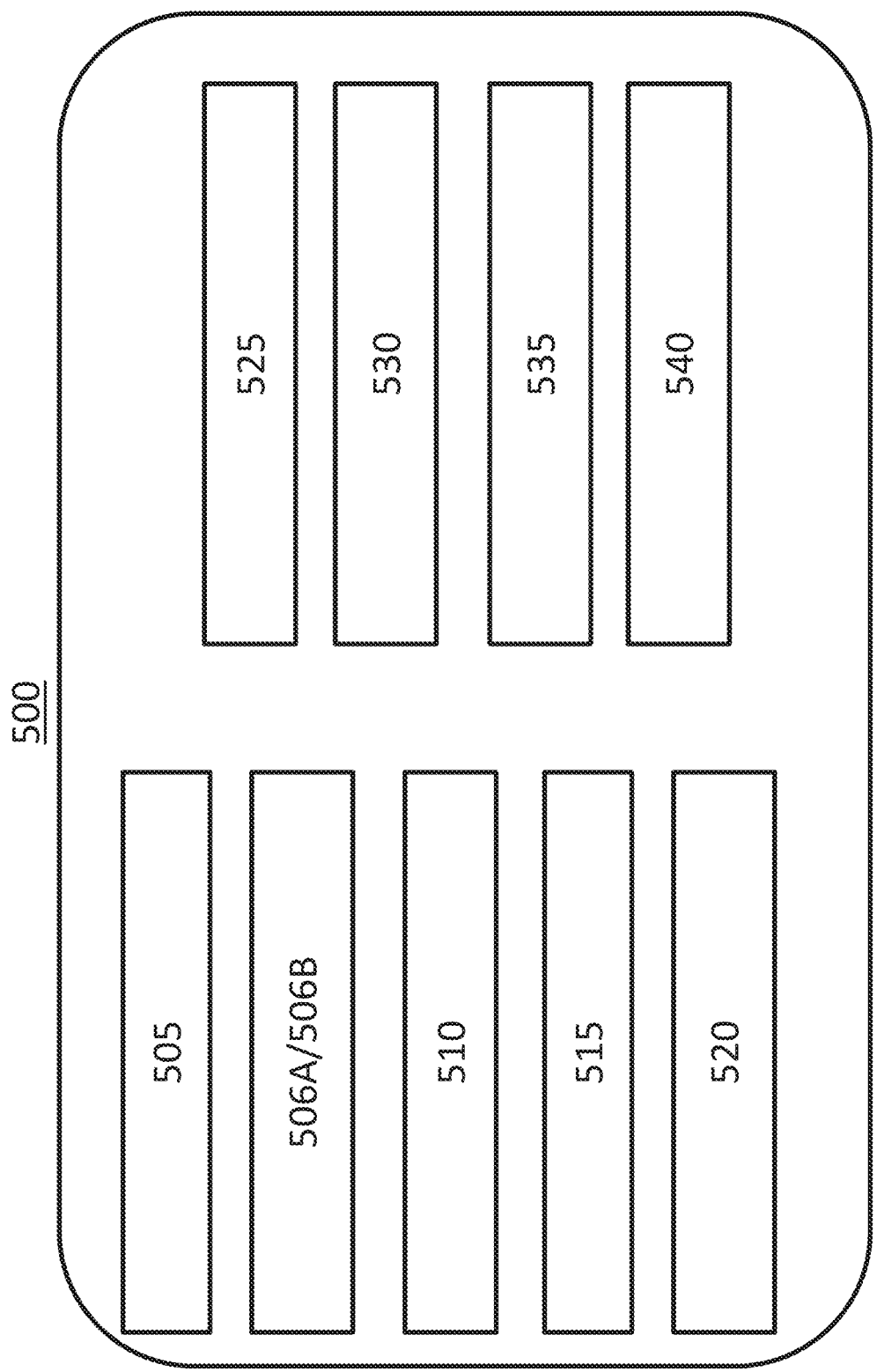
FIG. 5 illustrates an apparatus capable of performing the method of FIG. 3 according to an embodiment.
Figure 6:
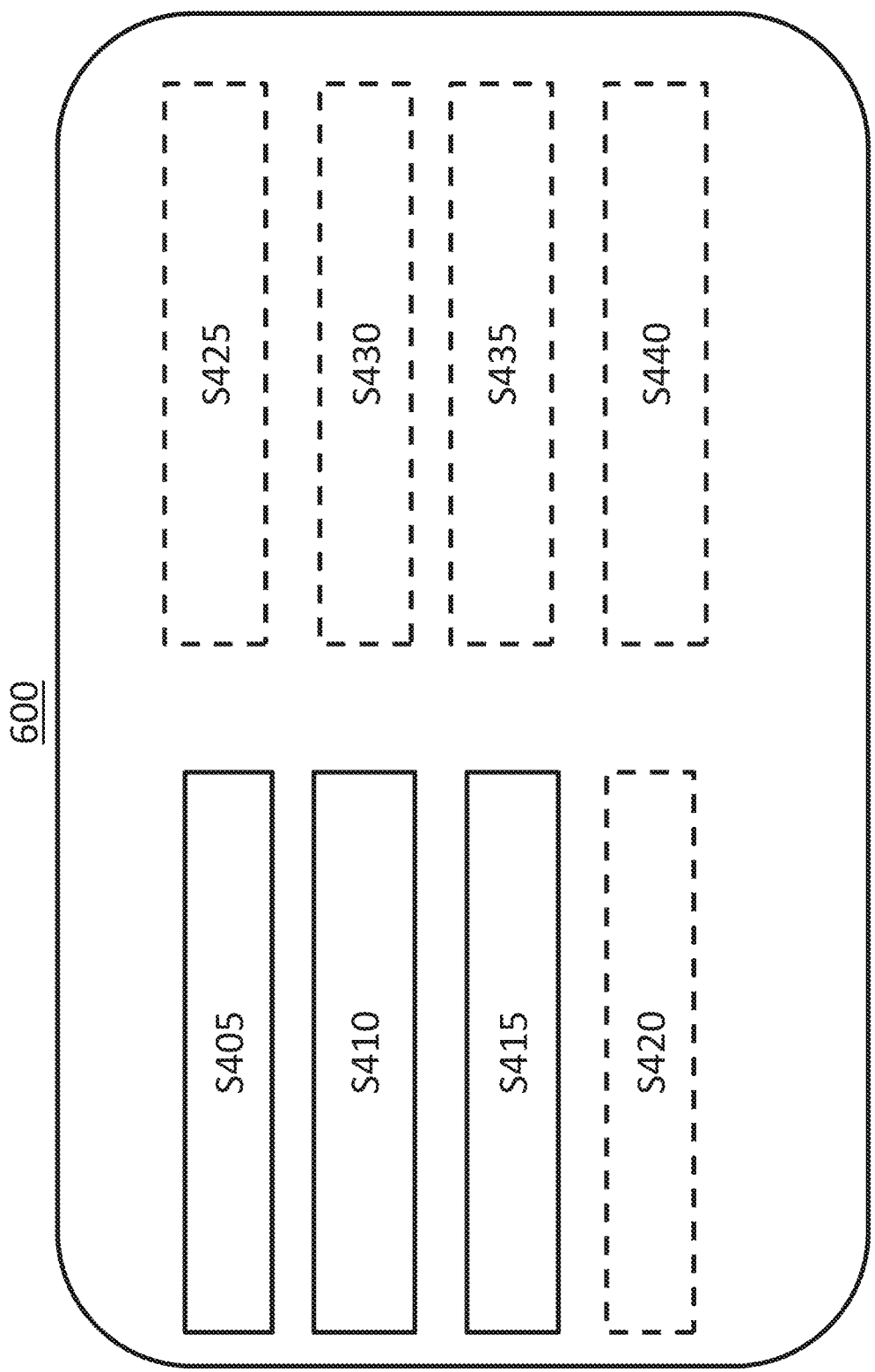
FIG. 6 illustrates an apparatus capable of performing the method of FIG. 4 according to an embodiment.

FIGS. 5 and 6 illustrate apparatuses 500 and 600 configured to perform the methods of FIGS. 3 and 4, respectively. The illustrated apparatuses each comprise a plurality of modules configured to perform corresponding operations from the methods. In particular, modules 505 through 540 in FIG. 5 are configured to perform corresponding functions S305 through S340 in FIG. 3, and modules 605 through 640 are configured to perform corresponding functions S405 through S440 in FIG. 4. In general, the modules may be implemented by any suitable combination of hardware and/or software capable of performing the designated functions.

In this description, certain embodiments are described with respect to particular types of impairments (e.g., frequency error). In general, the described concepts are applicable for other types of impairments as well, such as those whose impact increases in good signal/channel quality conditions. For example, an IQ imbalance condition in a receiver of the wireless device may have impairment effects that increase with channel quality. Moreover, a downlink timing misalignment condition, i.e., a condition in which a time at which the receiver of the wireless device expects a downlink subframe of the reference signal to start is misaligned with respect to the time at which the downlink subframe actually starts, may have similarly detrimental effects.

The described embodiments may provide various potential benefits compared to conventional approaches. For instance, certain embodiments allow a possible reduction in a static error in RS-SINR measurements observed at high Es/Iot levels. Certain embodiments can improve the accuracy of a measurement even if the frequency error is above a threshold.

Features from multiple embodiments described in this document may be combined with each other in various ways. Furthermore, embodiments may be used in LAA scenarios or in a more general case where a UE may need to configure a measurement period adaptively to one or more conditions, e.g., channel quality, Ês/Iot, SINR, received signal quality, total interference or interference on a specific resources or from a specific interferer(s), etc. Other non-limiting examples where the described herein methods may be beneficial include measurements for DRX or extended DRX, and measurements in high speed train environments.

The described embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

In some embodiments, the compensation of the low measurement accuracy condition (step S325 in method 300) may be performed as a function of the low measurement accuracy condition itself, the reference signal parameter being measured, and/or another parameter. In one example, the compensation may be a value (e.g., in dB) to be added to the measurement or a scaling factor applied to the measurement. The compensation may be larger in a better interference condition and/or a better signal/channel condition. Determining the compensation may comprise one or more of: estimating, calculating, or obtaining a compensation value based on a pre-defined rule, a mapping, a table, or a message or indication received from another node. In one embodiment, the compensating step may include the following sub-steps or functions in which the impact of an impairment such as frequency error is mitigated:

First, transform OFDM symbols of the reference signal for which the measurement is performed (e.g., CRS) from time-domain to frequency domain, and store resource elements (REs).

Second, extract and de-rotate the reference signal and estimate a frequency offset. Alternatively, assume a dense grid of frequency offsets e.g. {−40 −20, 0, 20, 40} Hz.

Third, on the stored REs, perform frequency domain filtering to remove the leakage (ICI) under the assumption of the estimated frequency offset or for the grid of frequency offsets (this might be done iteratively, e.g., if an improvement is observed when going from 0 to −20 Hz iterate the filtering with −40 Hz, otherwise iterate the filtering with 20 Hz).

Fourth, on the filtered REs, extract and de-rotate the reference signal over which the measurement is performed, and derive at least the first measurement (e.g., SINR). An iterated approach may be used based on SINR in each iteration.

Multipath channels can be handled by adding one step of channel estimation to the foregoing sub-steps as well. This approach may in principle be used to estimate and mitigate the impact of different impairment types, including frequency error.

The described embodiments may be implemented in any appropriate type of communication system supporting any suitable communication standards and using any suitable components. As one example, certain embodiments may be implemented in an LTE network, such as that illustrated in FIG. 7.

Figure 7:
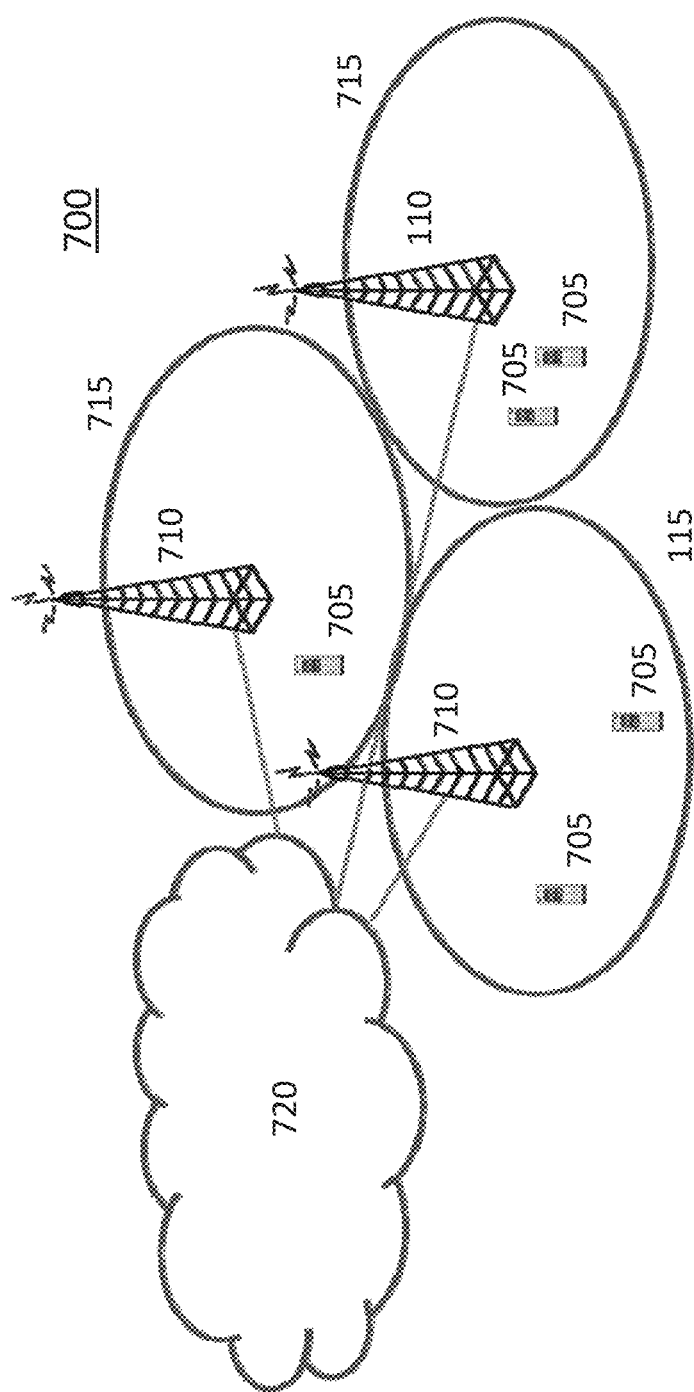
FIG. 7 is a diagram illustrating an LTE network according to an embodiment.

Referring to FIG. 7, a communication network 700 comprises a plurality of wireless communication devices 705, e.g., conventional UEs, machine type communication (MTC)/machine-to-machine (M2M) UEs, and a plurality of radio access nodes 710, e.g., eNodeBs, gNodeBs, or other base stations. Communication network 700 is organized into cells 715, which are connected to a core network 720 via corresponding to radio access nodes 710. Radio access nodes 710 are capable of communicating with wireless communication devices 705 along with any additional elements suitable to support communication between wireless communication devices or between a wireless communication device and another communication device (such as a landline telephone).

Figure 8:
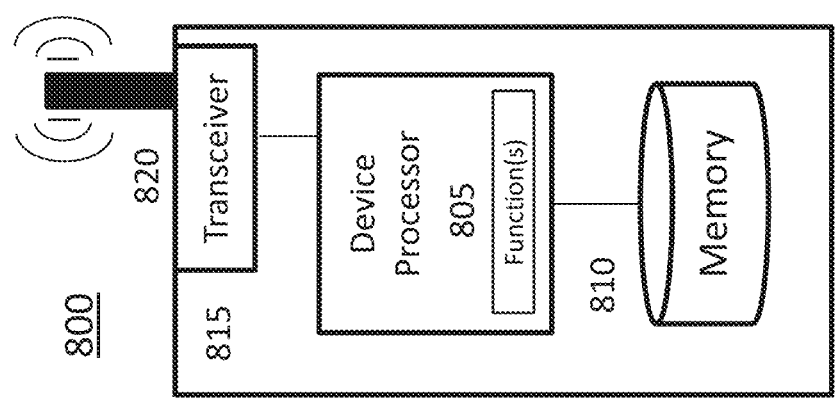
FIG. 8 is a diagram illustrating a wireless communication device according to an embodiment.

Although wireless communication devices 705 may represent communication devices that include any suitable combination of hardware and/or software, these wireless communication devices may, in certain embodiments, represent devices such as an example wireless communication device illustrated in greater detail by FIG. 8. Similarly, although the illustrated radio access node may represent network nodes that include any suitable combination of hardware and/or software, these nodes may, in particular embodiments, represent devices such as the example radio access node illustrated in greater detail by FIG. 9.

Referring to FIG. 8, a wireless communication device 800 comprises a processor 805, a memory, a transceiver 815, and an antenna 820. In certain embodiments, some or all of the functionality described as being provided by UEs, MTC or M2M devices, wireless communication enabled vehicles and/or any other types of wireless communication devices may be provided by the device processor executing instructions stored on a computer-readable medium, such as the memory shown in FIG. 8. Alternative embodiments may include additional components beyond those shown in FIG. 8 that may be responsible for providing certain aspects of the device's functionality, including any of the functionality described herein.

Figure 9:
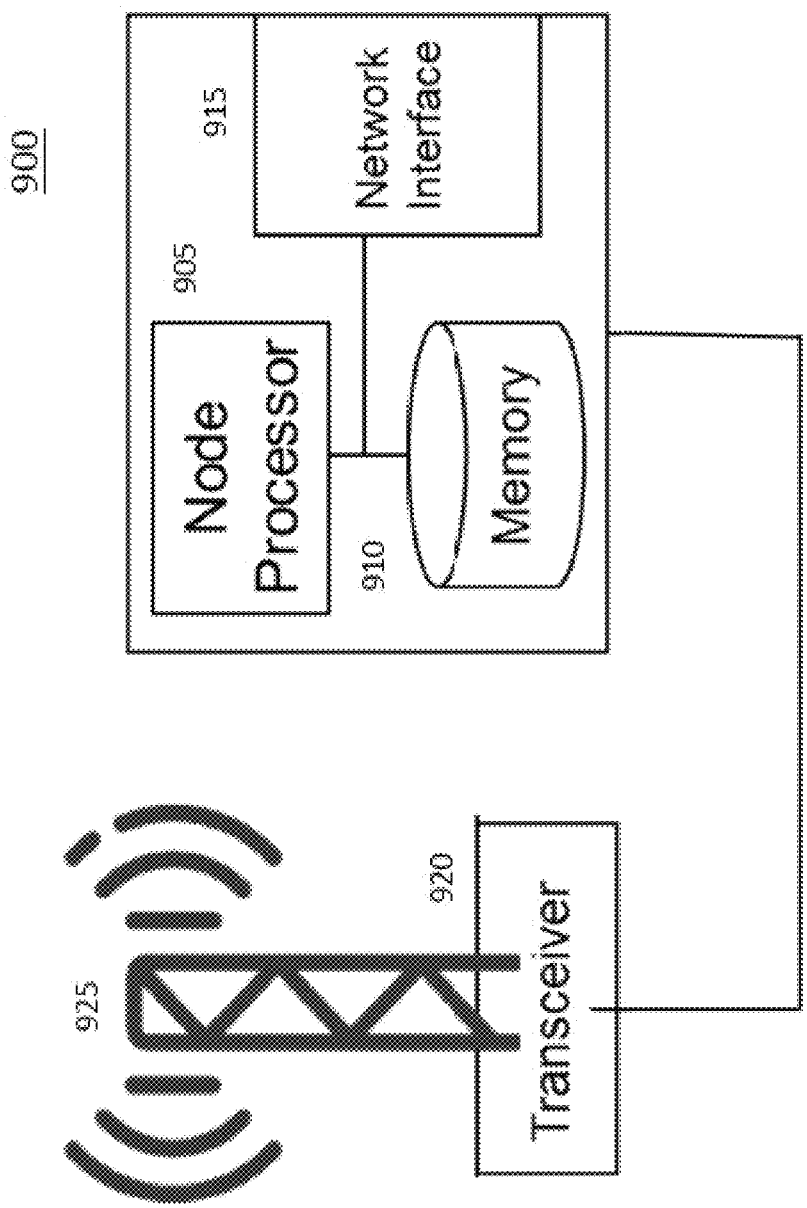
FIG. 9 is a diagram illustrating a radio access node according to an embodiment.

Referring to FIG. 9, a radio access node 900 comprises a node processor 905, a memory 910, a network interface 915, a transceiver 920, and an antenna 925. In certain embodiments, some or all of the functionality described as being provided by a base station, a node B, an enodeB, and/or any other type of network node may be provided by node processor 905 executing instructions stored on a computer-readable medium, such as memory 910 shown in FIG. 9. Alternative embodiments of radio access node 900 may comprise additional components to provide additional functionality, such as the functionality described herein and/or related supporting functionality.

Figure 10:
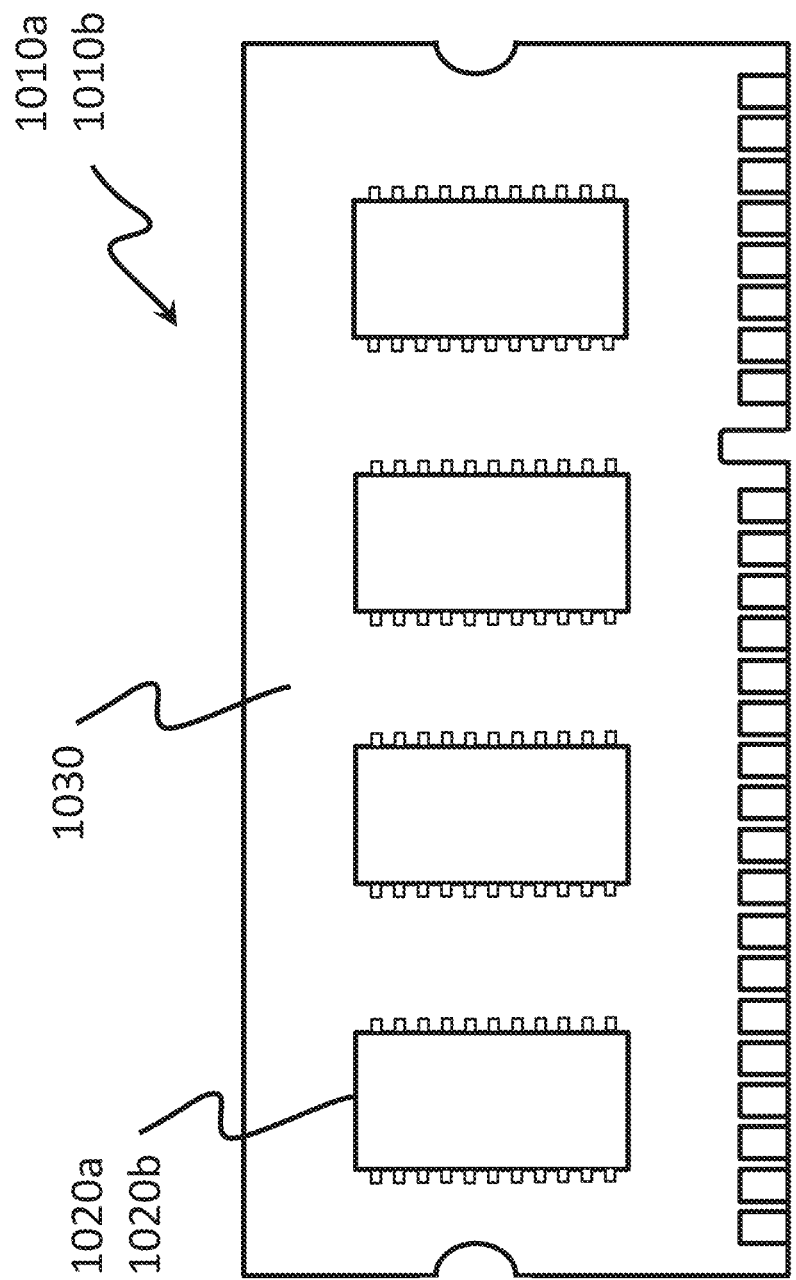
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the device processor 805 and thereto operatively coupled entities and devices, such as the transceiver 815 and the storage medium 810, to execute methods according to embodiments described herein. The computer program 1020a and/or computer program product 1010a may thus provide means for performing any steps of the wireless device as herein disclosed. On this computer readable means 1030, a computer program 1020b can be stored, which computer program 1020b can cause the node processor 905 and thereto operatively coupled entities and devices, such as the network interface 915 and the storage medium 910, to execute methods according to embodiments described herein. The computer program 1020b and/or computer program product 1010b may thus provide means for performing any steps of the radio network node as herein disclosed.

In the example of FIG. 10, the computer program product 1010a, 1010b is illustrated as a random access memory (RAM) module. The computer program product 1010a, 1010b could also be embodied in various other forms, such as an optical disc, a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. In some embodiments, a carrier containing the aforementioned computer program product is provided. The carrier is one of an electronic signal, an optical signal, or a radio signal. Thus, while the computer program 1020a, 1020b is here schematically shown as a track on the depicted optical disk, the computer program 1020a, 1020b can be stored in any way which is suitable for the computer program product 1010a, 1010b.

While the disclosed subject matter has been presented above with reference to various embodiments, it will be understood that various changes in form and details may be made to the described embodiments without departing from the overall scope of the disclosed subject matter.

| ABBREVIATIONS | |
|---|---|
| Abbreviation | Explanation |
| CA | Carrier Aggregation |
| CSI-RSRP | Channel State Information Reference Signal Received Power |
| DRS | Discovery Signal |
| DRX | Discontinuous Reception |
| eNB | Evolved node B |
| LAA | License Assisted Access |
| LBT | Listen Before Talk |
| LTE | Long-Term Evolution |

| ABBREVIATIONS | |
|---|---|
| Abbreviation | Explanation |
| RSRP | Reference Signal Received Power |
| RSRQ | Reference Signal Received Quality |
| UE | User Equipment |
| MTC | Machine Type Communication |
| M2M | Machine-to-Machine |

The invention claimed is:

1. A method implemented in a wireless device for improving measurement of a reference signal parameter measured by the wireless device in a wireless communication network, the reference signal parameter being a parameter of a reference signal transmitted by a radio network node in the wireless communication network, the method comprising:
determining that the wireless device is operating with a low measurement accuracy condition that affects measurement of the reference signal parameter, wherein a severity of the low measurement accuracy condition has a positive correlation with a quality of a channel over which the reference signal is received;
adapting a first measurement bandwidth in response to determining that the wireless device has the low measurement accuracy condition that is positively correlated with the quality of the channel;
measuring a first reference signal parameter using the adapted first measurement bandwidth; and
modifying the measured first reference signal parameter to compensate for the low measurement accuracy condition by adding a compensation value to the measurement of the first reference signal parameter.

2. The method of claim 1, wherein the low measurement accuracy condition includes at least one of:
a frequency error condition in which a frequency of a carrier of the reference signal is mismatched with a frequency on which the wireless device receives the carrier,
an IQ imbalance condition in a receiver of the wireless device, and a downlink timing misalignment condition in which a time at which the receiver of
the wireless device expects a downlink subframe of the reference signal to start is misaligned with respect to the time at which the downlink subframe actually starts.

3. The method of claim 1, further comprising reporting the low measurement accuracy condition to the radio network node.

4. The method of claim 1, further comprising adapting a second measurement bandwidth for measuring a second reference signal parameter in response to determining that the wireless device has the low measurement accuracy condition that is positively correlated with the quality of the channel.

5. The method of claim 1, further comprising one or more of:
reporting the measured first reference signal parameter to another node,
logging the measured first reference signal parameter, and/or
using the measured first reference signal parameter for one or more operational tasks.

6. The method of claim 1, wherein the compensation value is obtained based on a pre-defined rule, a mapping, a table, or a message or indication received from another node.

7. A method implemented in a radio network node for improving measurement of a reference signal parameter measured by a wireless device in a wireless communication network, the reference signal parameter being a parameter of a reference signal transmitted by the radio network node in the wireless communication network, the method comprising:

determining that the wireless device is operating with a low measurement accuracy condition that affects measurement of the reference signal parameter, wherein a severity of the low measurement accuracy condition has a positive correlation with a quality of a channel over which the reference signal is received;

adapting a first measurement bandwidth in response to determining that the wireless device has the low measurement accuracy condition that is positively correlated with the quality of the channel;

configuring the wireless device to measure a first reference signal parameter using the adapted first measurement bandwidth; and assisting the wireless device in modifying the measured first reference signal parameter to compensate for the low measurement accuracy condition by adding a compensation value to the measurement of the first reference signal parameter.

8. The method of claim 7, wherein the low measurement accuracy condition includes at least one of:

a frequency error condition in which a frequency of a carrier of the reference signal is mismatched with a frequency on which the wireless device receives the carrier, an IQ imbalance condition in a receiver of the wireless device, and a downlink timing misalignment condition in which a time at which the receiver of the wireless device expects a downlink subframe of the reference signal to start is misaligned with respect to the time at which the downlink subframe actually starts.

9. The method of claim 7, wherein determining that the wireless device is operating with a low measurement accuracy condition includes receiving an indication from the wireless device that the wireless device is operating with the low measurement accuracy condition.

10. The method of claim 7, further comprising adapting a second measurement bandwidth for measuring a second reference signal parameter in response to determining that the wireless device has the low measurement accuracy condition that is positively correlated with the quality of the channel.

11. The method of claim 7, further comprising receiving the measured first reference signal parameter from the wireless device.

12. A wireless device operable to measure a reference signal parameter of a reference signal transmitted by a radio network node in a wireless communication network, the wireless device comprising:

at least one transceiver;

at least one processor; and memory comprising instructions executable by the at least one processor whereby the wireless device is operable to:

determine that the wireless device is operating with a low measurement accuracy condition that affects measurement of the reference signal parameter, wherein a severity of the low measurement accuracy condition has a positive correlation with a quality of a channel over which the reference signal is received;

adapt a first measurement bandwidth in response to determining that the wireless device has the low measurement accuracy condition that is positively correlated with the quality of the channel;

measure a first reference signal parameter received by the at least one transceiver using the adapted first measurement bandwidth; and modify the measured first reference signal parameter to compensate for the low measurement accuracy condition by adding a compensation value to the measurement of the first reference signal parameter.

13. A radio network node operable to improve measurement of a reference signal parameter of a reference signal transmitted by the radio network node and measured by a wireless device in a wireless communication network, the radio network node comprising:

at least one transceiver;

at least one processor; and memory comprising instructions executable by the at least one processor whereby the wireless device is operable to:

determine that the wireless device is operating with a low measurement accuracy condition that affects measurement of the reference signal parameter, wherein a severity of the low measurement accuracy condition has a positive correlation with a quality of a channel over which the reference signal is received;

adapt a first measurement bandwidth in response to determining that the wireless device has the low measurement accuracy condition that is positively correlated with the quality of the channel;

configure the wireless device to measure a first reference signal parameter using the adapted first measurement bandwidth; and assist the wireless device in modifying the measured first reference signal parameter to compensate for the low measurement accuracy condition by adding a compensation value to the measurement of the first reference signal parameter.

\* \* \* \* \*

UNITED STATES PATENT AND TRADEMARK OFFICE
CERTIFICATE OF CORRECTION

PATENT NO. : 10,715,265 B2
APPLICATION NO. : 16/090346
DATED : July 14, 2020
INVENTOR(S) : Iana Siomina et al.

It is certified that error appears in the above-identified patent and that said Letters Patent is hereby corrected as shown below:

On the Title Page

"(54) METHODS AND APPARATUSES FOR CONTROLLING MEASUREMENTS BANDWIDTH TO ACCOUNT FOR IMPAIRMENTS"
Should read:
-- (54) METHODS AND APPARATUSES FOR CONTROLLING MEASUREMENT BANDWIDTH TO ACCOUNT FOR IMPAIRMENTS --.

Signed and Sealed this
Twenty-seventh Day of October, 2020

Andrei Iancu
*Director of the United States Patent and Trademark Office*